(12) United States Patent
White

(10) Patent No.: US 6,764,004 B2
(45) Date of Patent: Jul. 20, 2004

(54) LOGISTICS CHAIN MANAGEMENT SYSTEM

(75) Inventor: Michael White, Albert Park (AU)

(73) Assignee: Exago Pty Ltd. (AU)

( * ) Notice: Subject to any disclaimer, the term of this patent is extended or adjusted under 35 U.S.C. 154(b) by 0 days.

(21) Appl. No.: 10/398,460

(22) PCT Filed: Oct. 4, 2001

(86) PCT No.: PCT/AU01/01241
§ 371 (c)(1),
(2), (4) Date: Apr. 4, 2003

(87) PCT Pub. No.: WO02/29644
PCT Pub. Date: Apr. 11, 2002

(65) Prior Publication Data
US 2004/0000586 A1 Jan. 1, 2004

(30) Foreign Application Priority Data
Oct. 5, 2000 (AU) .............................................. PR0531

(51) Int. Cl.$^7$ ............................................. G06F 17/60
(52) U.S. Cl. ..................................... 235/385; 235/376
(58) Field of Search ................................ 235/385, 375, 235/376, 487; 705/22, 28

(56) References Cited

U.S. PATENT DOCUMENTS

| | | | | |
|---|---|---|---|---|
| 5,698,833 A | * | 12/1997 | Skinger | 235/462.09 |
| 5,869,819 A | * | 2/1999 | Knowles et al. | 235/375 |
| 6,085,170 A | * | 7/2000 | Tsukuda | 705/26 |
| 6,094,642 A | * | 7/2000 | Stephenson et al. | 705/28 |
| 6,629,642 B1 | * | 10/2003 | Swartz et al. | 235/462.46 |
| 2001/0026549 A1 | * | 10/2001 | Hameleers et al. | 370/389 |
| 2002/0082893 A1 | * | 6/2002 | Barts et al. | 705/8 |

* cited by examiner

Primary Examiner—Daniel St. Cyr
(74) Attorney, Agent, or Firm—Connolly Bove Lodge & Hutz LLP

(57) ABSTRACT

A logistics chain management system for which provides a network and databases to enable exporters or importers to book transport and storage facilities for all stages of the export/import transport/storage chain. An electronic document is created which eliminates the need to re enter data and thus reduces the incidence of errors. Quality assurance is achieved by monitoring consignments of goods with data loggers. All participants sign an agreement including predetermined transport conditions for the goods and a system manager monitors compliance using the data loggers.

8 Claims, 4 Drawing Sheets

LOGISTICS CHAIN MANAGEMENT SYSTEM

Figure 1A:
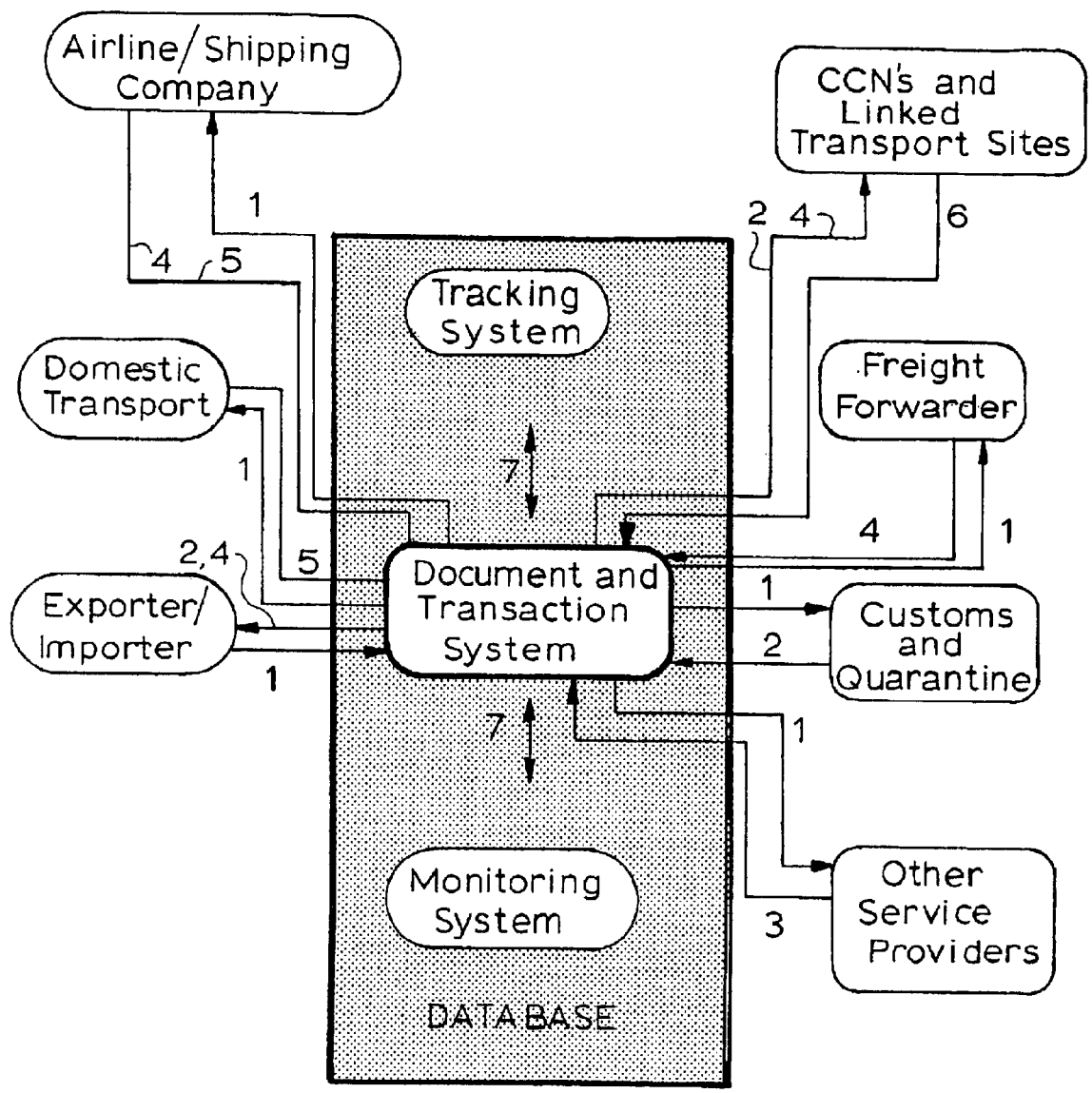

This invention relates to a system for managing a logistics chain particularly supply chains involving transitions between multiple transport providers.

BACKGROUND TO THE INVENTION

Supply and demand chains are a critical part in the manufacture and delivery of goods. Where the number of possible participants in a logistics chain are large, the management and timely co-ordination of services can be complex. One approach has been to reduce the number of participants and implement legally binding contracts to ensure that goods can be made and delivered in a short time frame with the minimum amount of handling and inventory storage. Another approach is to use a computer based decision support system of the kind described in U.S. Pat. Nos. 5,946,662 or 5,953,707. These are primarily concerned with linking component manufacturers.

Some products such as fresh food, wine, pharmaceuticals need to be transported under specified conditions particularly temperature controlled conditions as well as avoidance of unnecessary delay. Often for longer distance transport these products are transferred from land to air and or sea transport and again to land transport before they reach their destination. Storage is often required during transition from one transport provider to another. Often transport providers such as airlines cannot guarantee that goods will depart on particular scheduled flights. For security reasons the airlines do not identify the flight onto which goods will be loaded. If goods are delayed they may need special storage such as refrigerated storage.

If the goods arrive in unsatisfactory condition it is very difficult to identify where in the chain of transport and storage the goods were delayed or inappropriately handled. Because of this insurance of goods across such a chain is expensive or difficult to obtain.

Data logging of containers to record temperature or other environmental conditions during transportation has been proposed but these have proved expensive and return of the data loggers with integrity intact is difficult to achieve.

It is an object of this invention to provide greater certainty in the management of transport logistics chains.

BRIEF DESCRIPTION OF THE INVENTION

To this end the present invention provides a logistics management system for use by members who include goods suppliers, transport providers, storage providers, and customers wherein the members agree to comply with predetermined transport & storage conditions for the goods which includes a) a communication network accessible by members b) data storage means accessible over the network for storing details of a consignment of goods c) means in said communication network for notifying appropriate members of the entry of a consignment d) means for members to communicate with each other over the network e) means to collect data corresponding to the predetermined condition of the goods during transportation and storage f) means to record and track data pertaining to consignments of goods as the consignment moves along the supply chain to its eventual destination including the current location of the goods and compliance with the predetermined conditions g) means to generate reports from the data collected.

The term logistics includes movement of goods and information in both directions that is in a supply chain or in a demand chain.

By making the information about a consignment available over an accessible network and collecting data about the consignment, supplier and designated transport and storage providers an easily accessible record of the consignment can be displayed and printed as required. This does away with the need for multiple copies of the forms required for each of the service providers in the chain and by providing access to relevant government systems such as customs, and quarantine regulatory requirements can be satisfied. This represents a cost saving for all participants in the logistics chain. The information can be made available automatically by notifying members of the existence of a consignment eg: by email or allowing members to regularly interrogate the database for consignments of interest.

The collection of data on the condition of goods during transit makes it is possible to check whether reported damage to delivered goods could have occurred during transit and identify the likely time and location as well as the provider responsible for the goods at the time. This is essential to quality assurance for the logistics chain. The condition monitored may be any condition relevant to the quality and value of the goods including ambient conditions such as temperature, humidity, pressure, package atmosphere, package integrity, impact and vibration during transport and handling.

The most common requirement for transport of perishable products is maintenance of temperature of the consignment within a specified range. A data logger incorporating a temperature sensor will measure the temperature at predetermined intervals so that the temperature of the goods at any location during the transport of the goods can be determined. Another condition is avoidance of shock. This is important for fragile products or for live produce such as crabs where shock can cause damage that affects the price that the goods can command. An impact sensor on a data logger can record the day and time that an impact above a predetermined threshold occurred.

The data logger may be active or passive. An active data logger senses a predetermined condition records the information and transmits the data to a central data base at predetermined intervals. A passive data logger senses and records the condition but has to be read by a an appropriate reader at various times along the logistics chain. The presence of a data logger and the need for the central data base to be advised of the receipt and dispatch of the consignment along the chain means that at any time the system can track and identify the location of the consignment.

Preferably a logistics chain manager is appointed to ensure that all the appropriate data is collected and that all suppliers and transport and storage providers in the supply chain have agreed to comply with the standards and quality assurance criteria.

A benefit in having such a manager is that suppliers, providers and buyers can have access to the collected data to resolve disputes. The provision of the data makes it more likely that insurance recovery can be obtained for the consignment during transit. The costs of the system may be recouped by the manager collecting membership fees, messaging fees, monitoring fees.

The functions needed for the total system include:

a documentation system including waybills, consignment notes, health certificates, shippers letter of instruction, dangerous goods declaration, etc transaction system including payment for goods, transport and handling services etc monitoring system including location of consignment and environment conditions etc data collection and management including data from documents, transactions, monitoring and transport schedules etc performance reporting including benchmarking against standards set in the agreements made by all participants.

The data storage requirements to support the documentation and data collection and transaction systems may be in one central location but may also be distributed and be in a variety of physical locations that are all accessible over the same network.

In another aspect, the invention provides a system that is open to any party who bids to provide one of the services in the chain. To that end there is provided a transport chain management system for use by goods suppliers, transport providers and/or storage providers comprising a) a communication network b) data storage means accessible over the network for storing details of available suppliers and providers c) a bulletin board system associated with said data storage for listing transport requirements for consignments of goods d) means in said communication network for registering interest in providing transport or storage service for a listed consignment e) optionally a matching means for matching registered interests with appropriate consignments and notifying these to the goods supplier f) means for the goods supplier to communicate with interested providers over the network g) means to collect data corresponding to the condition of the goods during transportation and storage h) means to record and track data pertaining to consignments of goods as the consignment moves along the supply chain to its eventual destination i) means to generate reports from the data collected j) wherein the providers and suppliers agree to comply with predetermined transport conditions for the goods.

DETAILED DESCRIPTION OF THE INVENTION

A preferred form of the invention will be described based on the export of fresh food from Australia to an overseas destination.

Figure 1B:
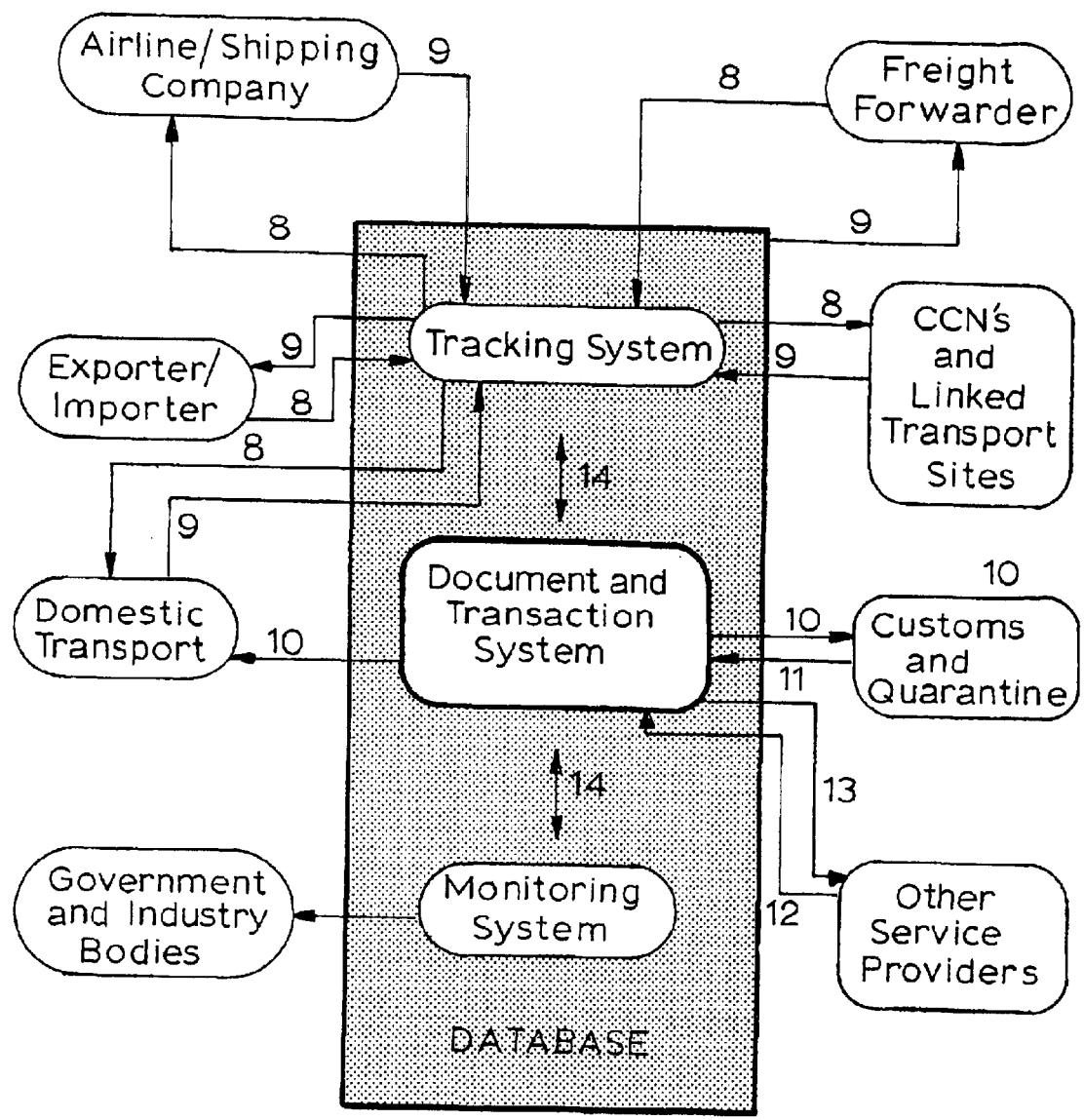
Figure 1C:
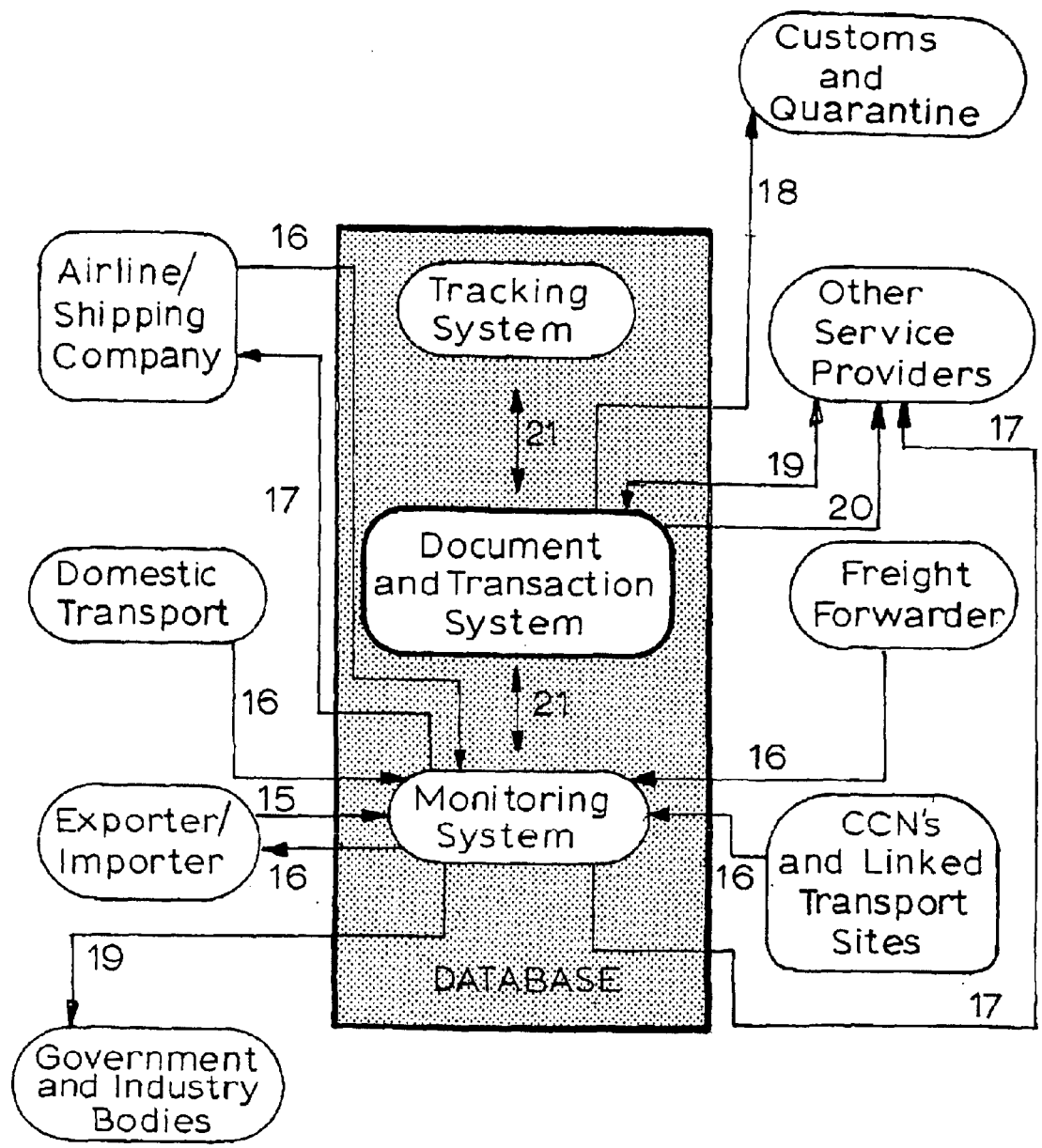
Figure 2:
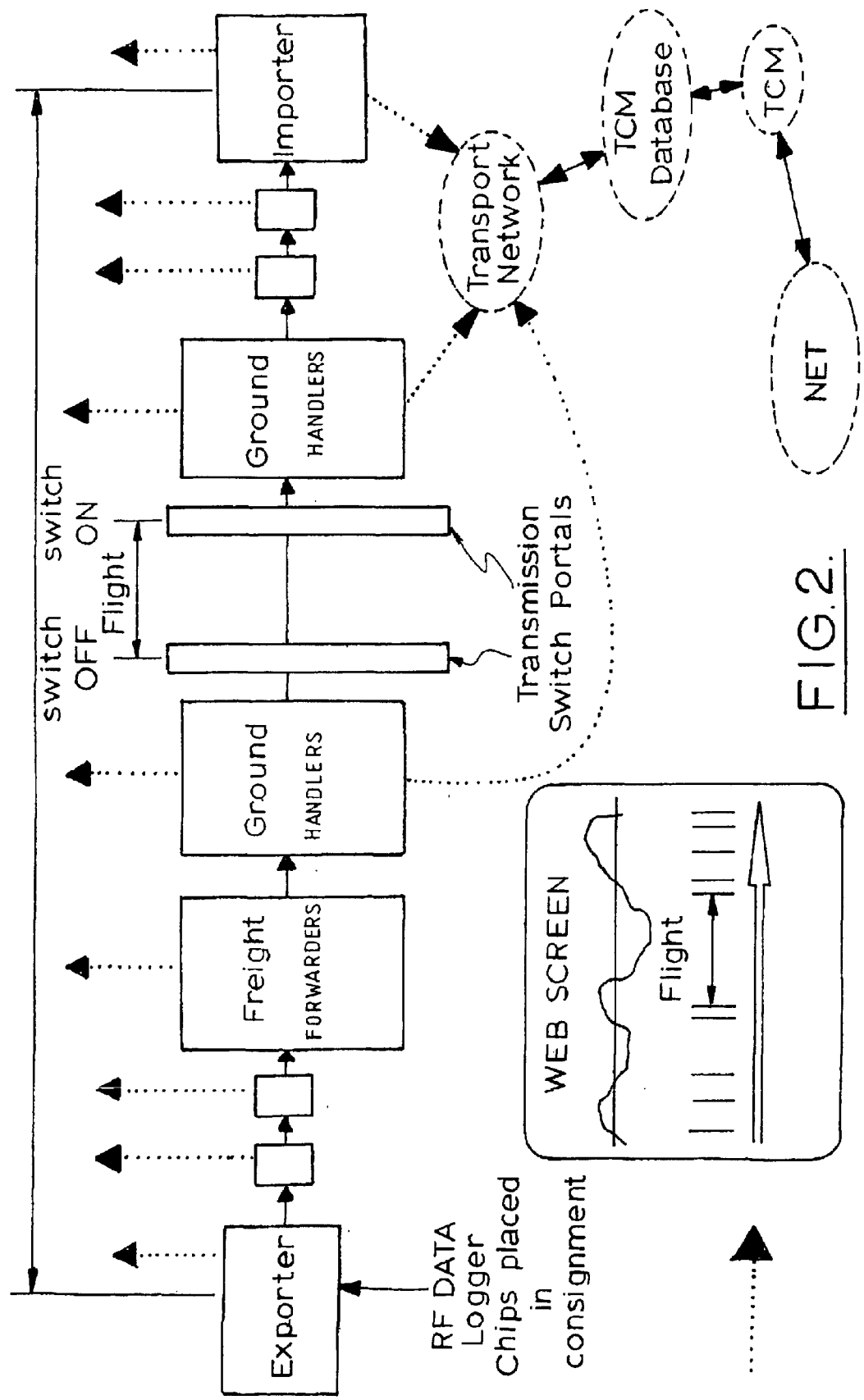

FIGS. 1A, 1B and 1C are data flow diagrams of one embodiment of the logistics chain management system of this invention FIG. 2 is a schematic flow diagram of the data logging system used in this invention.

With reference to the figures the participants in the system include

Airlines and shipping companies

Ancillary Suppliers,

Cargo Community Networks [CCN] which are made up of at least some of the other participants, Customs and Quarantine authorities, Freight forwarders, Fresh produce exporters, Fresh produce importers, Government agencies such as freight export information providers, Packer/cool store, Transporters including road hauliers and carriers in the importing country.

Possible additional participants include customs brokers, consolidators, container terminal operators, ground handlers, ramp handlers, emergency services, information providers, insurers, bankers, container depot operators, stevedores and port authorities.

Each of these participants interact over a network such as the internet with three interactive databases 1. Electronic Air/Sea/Road Tracking System [FIG. 1A]

2. A electronic document and transaction system [FIG. 1B] which preferably uses a single electronic document which links all participants in the export chain enabling creation of airway bills [AWB], product notifications to all links in the product custody chain. Government Customs and Quarantine documentation and pre-clearance of consignments.

3. A Monitoring System [FIG. 1C and FIG. 2] which is a broad based data logging facility and database of cool-chain management and packaging and handling performance.

The network is secure even though it is easily accessible. Specific documents and messages will be available to specified participants to ensure that commercial and legal interests of all parties are protected.

The data flow lines for the document transaction system are indicated in the system diagram and for FIG. 1A: are 1. Consignment information provided via Document and Transaction system to all participants 2. Customs and Quarantine documents and clearances provided via Document and Transaction system 3. Financial and insurance documents 4. Trade documents.

5. Transport documents

6. International document exchange

7. Internal data interchange

For FIG. 1B the data lines relate primarily to the consignment tracking system and are:

8. Tracking inquiry

9. Location related data

10. Consignment data

11. Customs quarantine clearance and data

12. Packaging and/or monitoring information

13. Information required for other service providers

14. Internal data interchange

For FIG. 1C the data lines relate to the monitoring system and are:

15. monitoring inquiry 16. temperature related data or data collected by the various sensors on the data loggers 17. temperature and other information for insurance claims, litigation etc 18. Customs/quarantine clearance data 19. Packaging and/or monitoring information 20. Information required for other service providers 21. Internal data interchange The means for booking services for the transit of goods from supplier to receiver may be pre arranged or by way of a bidding system. If all participants must be members and producers or exporters have established or prearranged suppliers of transport and storage services the entry of a new consignment into the system automatically creates a supply chain from producer to customer and notifies each of the producers suppliers of the consignment. This notification may be by email. Each member will be able to access and add to the required documentation.

Alternately the means for booking may be a bidding system initiated by the posting of a consignment notice on an electronic bulletin board. Participants who are registered for providing transport and/or storage services on the consignment route are notified electronically [eg by email] of the posting and may then submit bids to carry out part of the services for the consignment. When bids are received for all services required, the exporter who posted the notice selects the required participants and notifies them.

The benefit of the system is faster bookings and notifications of changes as well as the replacement of a complex paper trail with an electronic easily accessed record.

The system is managed by a through chain manager [TCM] who is responsible for maintaining the system and maintaining a register of participants. All participants sign a through chain agreement [TCA] which sets out their obligations as a participant to comply with industry handling standards for each consignment. These industry standards include travel time and temperature control for the goods so that if delays occur the goods will be placed in appropriate storage [eg a cool store at the airport]. The TCA may also require participants to co-operate with the TCM in installing and returning data loggers attached to consignments to enable statistical analysis of the handling of consignments as they pass through the supply chain.

Compliance with industry standards may be monitored by the TCM who also provides assistance to all participants in adopting best practice for packing transporting and storing fresh produce.

Consignments of goods are monitored as they pass through the supply chain to provide data that can be analysed to determine aspects of the chain and goods handling which can be improved. Monitoring may be carried out by routine random inspections and/or by data logging. A wide range of data loggers are available and can be used as appropriate. The data loggers may measure temperature and humidity at predetermined time intervals and store these for retrieval when the data loggers are returned to the TCM. Alternatively radio transmitters attached to the data loggers can transmit data back to the central data base for analysis. A preferred data logger for temperature monitoring is the KSW microtech tempsense label marketed by KSW Microtec GMBH. Micro devices of the smart card type are small enough to be concealed within the consignment to provide representative data and to foil unauthorised removal. Alternatively or additionally, monitors mounted in transport containers can also be used.

FIG. 2 is a schematic outline of a data logging system using radio frequency [RF] data loggers arranged to transmit temperature data for a consignment over a mobile phone network and the internet back to the central data base for storage analysis and statistical or graphical display. The data collected at predetermined intervals may be transmitted at predetermined intervals back to the central data base or down loaded and transmitted [RF] over a land line at the end of each stage in the supply chain.

During air transit the RF transmitters are disabled to comply with air safety standards. This can be achieved by portals at the load and unload stations at the airports.

The data loggers can be installed at strategic positions within the consignment pallet or container to provide an accurate measure of the conditions for all products in the consignment. Temperature, humidity, shocks, are some of the environmental conditions to be monitored depending on the product. The data logged in this way enables disputes about the condition of the goods to be resolved more easily. It will be a condition of the through chain agreements [TCA] that data loggers are used and not removed during transit. With RF transmission of data it is not necessary that the data logger be returned to the TCM or the exporter.

The data logging means that new handling methods or packaging concepts can be trialled in a live system.

From the above description it can be seen that the present invention provides a system that reduces delays and the complexity of paper work involved with export of fresh produce and also provides quality assurance to exporters and importers.

Variations to the arrangements described and alternatives to the services or equipment described may be substituted for those described to suit the preferences of the members.

What is claimed is:

1. A logistics chain management system for use by members who include goods suppliers, transport providers, storage providers, and customers wherein the members agree to comply with predetermined logistic conditions for the goods which system includes:
   a) a communication network accessible by members;
   b) data storage means accessible over the network for storing details of a consignment of goods;
   c) means in said communication network for making available to appropriate members details of said consignment;
   d) means for members to communicate with each other over the network;
   e) means to collect data corresponding to the predetermined condition of the goods during transportation and storage;
   f) means to record and track data pertaining to said consignment as the consignment moves along the supply chain to the consignment eventual destination including the current location of the goods and compliance with the predetermined conditions; and
   g) means to generate reports from the data collected.

2. A logistics chain management system as claimed in claim 1 which also includes a manager responsible for the operation of the system and the collection of data.

3. A logistics management system as claimed in claim 2 in which the communication network is the internet.

4. A logistics management system as claimed in claim 1 in which the communication network is the internet.

5. A logistics system as claimed in claim 1 wherein one of the predetermined conditions is the maintenance of the temperature of the goods within a predetermined range and the means for tracking the data incorporates a temperature sensor and data logger that periodically senses the temperature of the goods and stores the data or transmits the data to said network accessible storage means.

6. A logistics system as claimed in claim 1 wherein one of the preconditions relates to avoidance of shock to the goods and the data logger incorporates a shock sensor to record the date and time that shocks greater than a predetermined threshold occur and optionally transmit the data to the network accessible data storage.

7. A logistics chain management system for use by goods suppliers, transport providers and/or storage providers comprising:

a) a communication network;

b) data storage means accessible over the network for storing details of available suppliers and providers;

c) a bulletin board system associated with said data storage for listing transport requirements for consignments of goods;

d) means in said communication network for registering interest in providing transport or storage service for a listed consignment;

e) means to record and track data pertaining to consignments of goods as the consignment moves along the supply chain to the consignment eventual destination;

f) means to generate reports from the data collected;

g) wherein the providers and suppliers agree to comply with predetermined transport conditions for the goods;

h) means for the goods supplier to communicate with interested providers over the network; and i) means to collect data corresponding to the condition of the goods during transportation and storage.

8. A system as claimed in claim 7 wherein a through chain manager is responsible for maintaining the network accessible data base and for ensuring that the data logging system is properly used.

* * * * *